(12) United States Patent
Arriola et al.

(10) Patent No.: US 9,616,789 B2
(45) Date of Patent: Apr. 11, 2017

(54) SEAT HEADREST

(71) Applicant: Cardiff Products, San Marcos, CA (US)

(72) Inventors: Jason Arriola, San Marcos, CA (US); Will Regan, Carlsbad, CA (US)

(73) Assignee: Cardiff Products, San Marcos, CA (US)

( * ) Notice: Subject to any disclaimer, the term of this patent is extended or adjusted under 35 U.S.C. 154(b) by 302 days.

(21) Appl. No.: 14/407,057

(22) PCT Filed: Jun. 11, 2013

(86) PCT No.: PCT/US2013/045134
§ 371 (c)(1),
(2) Date: Dec. 10, 2014

(87) PCT Pub. No.: WO2013/188371
PCT Pub. Date: Dec. 19, 2013

(65) Prior Publication Data
US 2015/0145307 A1    May 28, 2015

Related U.S. Application Data

(60) Provisional application No. 61/658,041, filed on Jun. 11, 2012.

(51) Int. Cl.
*B60N 2/48* (2006.01)
*B60N 2/44* (2006.01)

(52) U.S. Cl.
CPC ........... *B60N 2/4882* (2013.01); *B60N 2/485* (2013.01); *B60N 2/4844* (2013.01); *B60N 2/4847* (2013.01); *B60N 2/4879* (2013.01); *B60N 2002/4405* (2013.01)

(58) Field of Classification Search
USPC .................................. 297/402, 400, 399, 397
See application file for complete search history.

(56) References Cited

U.S. PATENT DOCUMENTS

| | | | | |
|---|---|---|---|---|
| 3,114,527 | A | * 12/1963 | Demarest | A47C 20/026 248/118 |
| 3,174,799 | A | *  3/1965 | Haltenberger | B60N 2/4855 297/397 |
| 3,226,159 | A | * 12/1965 | Binding | B60N 2/4879 297/397 |

(Continued)

FOREIGN PATENT DOCUMENTS

FR          2836100          8/2003

OTHER PUBLICATIONS

Universal Rear Seat Headrest Mount for Tablets. Installation Manual. Arkon Resources, Inc. 2011. URL: http://www.arkon.com/manuals/TAB-RSHM.pdf.

*Primary Examiner* — David E Allred
(74) *Attorney, Agent, or Firm* — Lewis Kohn & Walker LLP; David M. Kohn; Kari Moyer-Henry

(57) ABSTRACT

A seat headrest having at least one side cushion, a base and a plurality of headrest connection points for use in conjunction with existing, standard car headrests. The seat headrest may have a first side cushion and a second side cushion to provide head and neck support by serving as headrests on the sides of a users head. The user may be any individual in a passenger vehicle.

14 Claims, 18 Drawing Sheets

(56) References Cited

U.S. PATENT DOCUMENTS

| | | | | |
|---|---|---|---|---|
| 3,292,974 A | * | 12/1966 | Gelbman | A47C 7/38 297/400 |
| 3,506,306 A | * | 4/1970 | Herzer | B60N 2/4847 297/397 |
| 3,578,383 A | | 5/1971 | Earl | |
| 4,440,443 A | | 4/1984 | Nordskog | |
| 4,619,483 A | * | 10/1986 | Dickey | A47C 7/383 297/394 |
| 4,744,599 A | * | 5/1988 | Jankowski | A47D 1/10 297/130 |
| 4,971,393 A | * | 11/1990 | Maisenhalder | A47C 7/383 248/118 |
| 5,154,477 A | | 10/1992 | Lacy | |
| 5,273,342 A | * | 12/1993 | Pratt | B60N 2/4879 297/391 |
| 5,505,523 A | | 4/1996 | Wang | |
| 6,095,611 A | * | 8/2000 | Bar | A61G 5/1067 297/228.13 |
| 6,789,851 B2 | | 9/2004 | Smith | |
| 7,938,491 B2 | | 5/2011 | Montnore | |
| 7,958,582 B1 | | 6/2011 | Scamardo | |
| 8,528,978 B2 | * | 9/2013 | Purpura | B64D 11/06 248/118 |
| 2004/0155507 A1 | * | 8/2004 | Carta Gonzalez | A47C 7/383 297/397 |
| 2006/0244300 A1 | * | 11/2006 | Watson Savage | B60N 2/4855 297/397 |
| 2009/0058161 A1 | * | 3/2009 | Meert | B60N 2/4879 297/397 |
| 2010/0289000 A1 | | 11/2010 | Kojima | |
| 2010/0289315 A1 | | 11/2010 | Jackson | |
| 2011/0210531 A1 | * | 9/2011 | Moore | B62B 9/245 280/727 |
| 2012/0007405 A1 | | 1/2012 | Kim | |
| 2013/0187428 A1 | * | 7/2013 | Albino | B60N 2/4879 297/397 |
| 2015/0375766 A1 | * | 12/2015 | Taylor | B62B 7/142 280/647 |
| 2016/0046315 A1 | * | 2/2016 | Zehfuss | B62B 7/008 280/33.993 |

* cited by examiner

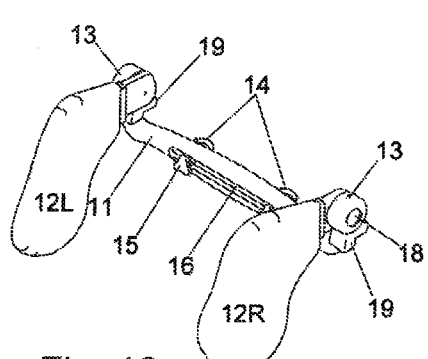
Fig. 12a
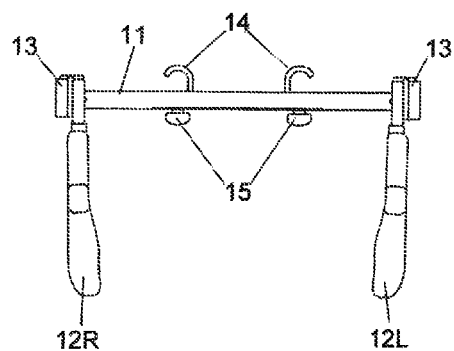
Fig. 12b
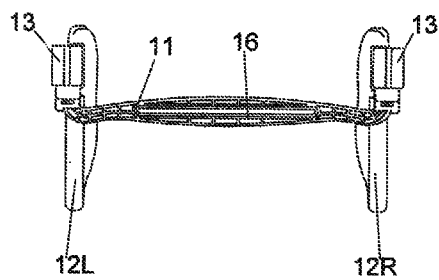
Fig. 12c
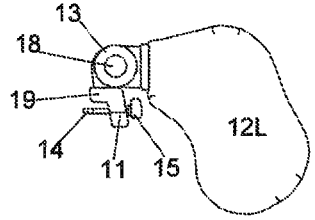
Fig. 12d
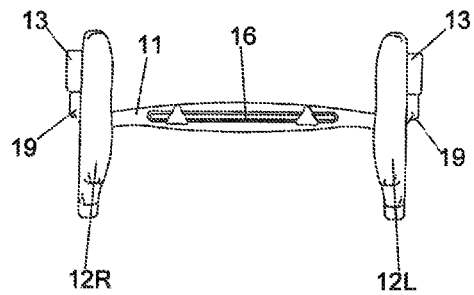
Fig. 12e
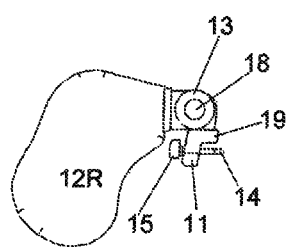
Fig. 12f
Fig. 12

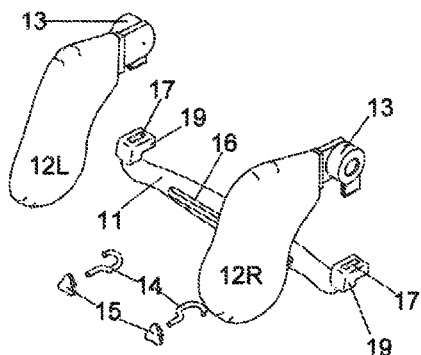
Fig. 13a
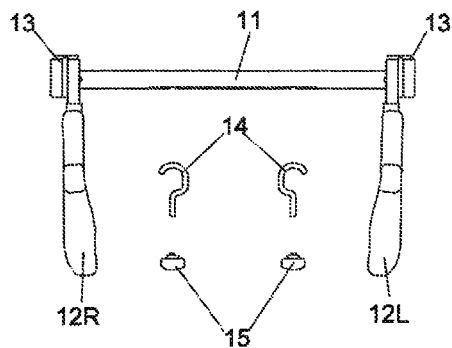
Fig. 13b
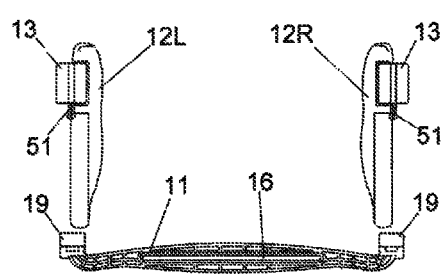
Fig. 13c
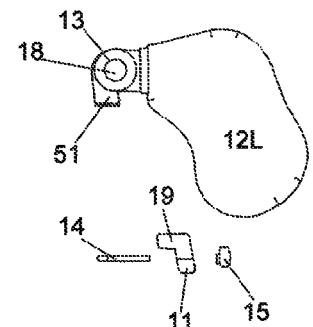
Fig. 13d
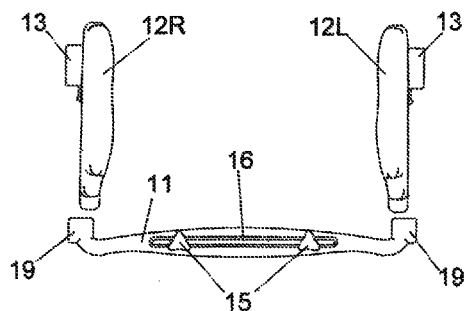
Fig. 13e
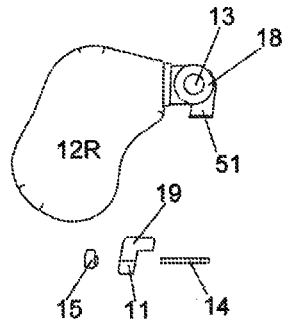
Fig. 13f
Fig. 13

SEAT HEADREST

RELATED APPLICATIONS

This application is a United States National Stage Application claiming priority under 35 U.S.C. 371 from International Patent Application No. PCT/US13/45134 filed on Jun. 11, 2013, which claims priority from U.S. Provisional Application No. 61/658,041, filed on Jun. 11, 2012, the contents of which are hereby incorporated by reference herein.

FIELD OF THE INVENTION

The present invention pertains generally to seat headrests. More particularly, the present invention pertains to a supplemental headrest attached to currently existing car seats with headrests.

BACKGROUND OF THE ART

Car headrests are well known in the art. Since the 1960's, cars have included headrests as standard equipment. One of the more prevalent of the car headrest has a padded surface attached to two headrest posts which lock into position. The padded surface is positioned to be at the rear of a head of a user and does not provide any support elsewhere.

Neck pillows are, also well known in the art. A common configuration of a neck pillow has a generally shaped pillow placed around a neck to provide a pillow base around a head. This configuration does not have sufficiently structural support outside of the density of the pillow itself. The neck pillow also does not have rigidity in terms of positioning. This means that the neck will shift and move along with the user causing it to not be positioned in a way most optimal for resting or sleeping.

U.S. Pat. No. 3,578,383 to Earl discloses a pillow for full support of one side of a user's head and is designed to slip over the to of a seat back. The user must sleep leaning to that one side in order to take advantage of the pillow support. If desired, two pillow supports can be used with a separate base support for the two pillow device.

U.S. Pat. No. 4,440,443 to Nordskog discloses a headrest inflated with air or liquid, or filled with foamed plastic material for attachment to the backrest of chair, sofa, etc. The headrest may also provide improved privacy through incorporation of a privacy roof and eye shield. When not in use the headrest may be removed from the backrest for storage.

U.S. Pat. No. 5,154,477 to Lacy discloses a head support attachable vehicle seat for providing both frontal and lateral support of the head. However, attachment of the head support is dependent on a jacket or slipcover being placed over the vehicle seat and secured with a hook-and-loop-type fastener.

U.S. Pat. No. 5,505,523 to Wang discloses a safety nap cushion for use with a chair back consisting of a reverse U-shaped inflatable back cushion, two inflatable side cushions and an adjustable retraining strap suitable for being positioned over the user's face and across the front of the side cushions to prevent lateral movement of the side cushions when under pressure.

U.S. Pat. No. 6,789,851 to Smith discloses a child's sleep collar for use with a child safety seat that includes a pair of collar supports and provides lateral and frontal support to the head of a sleeping child restrained in the child safety seat. Each of the individual collar supports includes a coupling end for attachment to the child safety seat.

U.S. Pat. No. 7,938,491 to Montuore discloses a curved shape head rest to provide full head support hacking with two concave sides of equal proportion to support the head while turned as well as preventing the neck from tilting at an uncomfortable angle. The headrest attaches to the existing headrest on a seat by adjustable straps.

United States Patent Publication No. 2010/0289315 to Jackson discloses a head and neck support for a passenger in a vehicle including a rod for joining the apparatus to a seat headrest and side rods for supporting cushions. Positioning of the side cushions is restricted to a vertical movement up or down the length of the side rod.

United States Patent Publication No. 2012/0007405 to Kim discloses a car seat headrest comprising a holding bar and a head support portion attached to the holding bar. Installation of the headrest to a car seat requires the complete removal of the existing headrest in order to be able to insert the headrest stays into the openings in the holding bar. Positioning of the headrest pillow requires disassembly of the headrest and additional components to accomplish alternative configurations of the pillows.

In light of the above, it is an object of the present invention to provide the desired features described herein as well as additional advantages such as providing a user with supplemental head and neck support when desired. The compact design of the supplemental headrest provides for convenient stowage when the headrest is not in use. The key to a compact design is the minimal base and integrated hinge as part of each side cushion. Preferably, the seat headrest is used in conjunction with an already existing seat headrest. Another object of the present invention is to provide a seat headrest that is easily assembled and disassembled for ease of transport and compatibility with all types of seats with existing headrests.

It is an object of this invention to provide a system and method to provide head and neck support supplementing currently existing seat headrests.

SUMMARY OF THE INVENTION

The present invention is directed to solving a deficiency in the art of car headrests. The present invention describes a seat headrest having at least one side cushion, a base and a plurality of headrest connection points. The seat headrest may have a first side cushion and a second side cushion.

The standard car headrest only provides support to the back of the head without regard to the left side or the right side of the head due to its positioning. The first side cushion and the second side cushion provide head and neck support by serving as headrests on the sides of the user's head. The user can then rest their head on the first or second side cushion for a more comfortable resting or sleeping position.

The side cushion, the base and the plurality of headrest connection points are preferably constructed from injection molded plastic to provide a sturdy and rigid structure. The side cushion may then be covered by a padded material such as foam to provide a soft, cushioned surface. The side cushion is then wrapped by a soft outer material such as fabric, or nylon to cover the padded material and provide a more desirable aesthetic. The soft outer material can have a design print or be monochrome without departing from the spirit of the present invention. There may also be an expandable fabric hood or a strap that attaches over the car's original headrest as an optional mounting type to accommodate vehicle headrests not supported by support rods. The side cushion is curved about a midpoint, and the first side cushion and the second side cushion extend downwardly from the headrest arm.

The headrest arm is vertically adjustable by having hinges located in the side cushions where the side cushions attach to the base allowing for variable vertical positioning of the side cushions independently of each other.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 12 illustrates several views of the assembled seat headrest as 12a, 12b, 12c, 12d, 12e and 12f.

FIG. 13 illustrates several exploded views of the seat headrest as 13a, 13b, 13c, 13d, 13e and 13f.

DETAILED DESCRIPTION OF THE INVENTION

Figure 1:
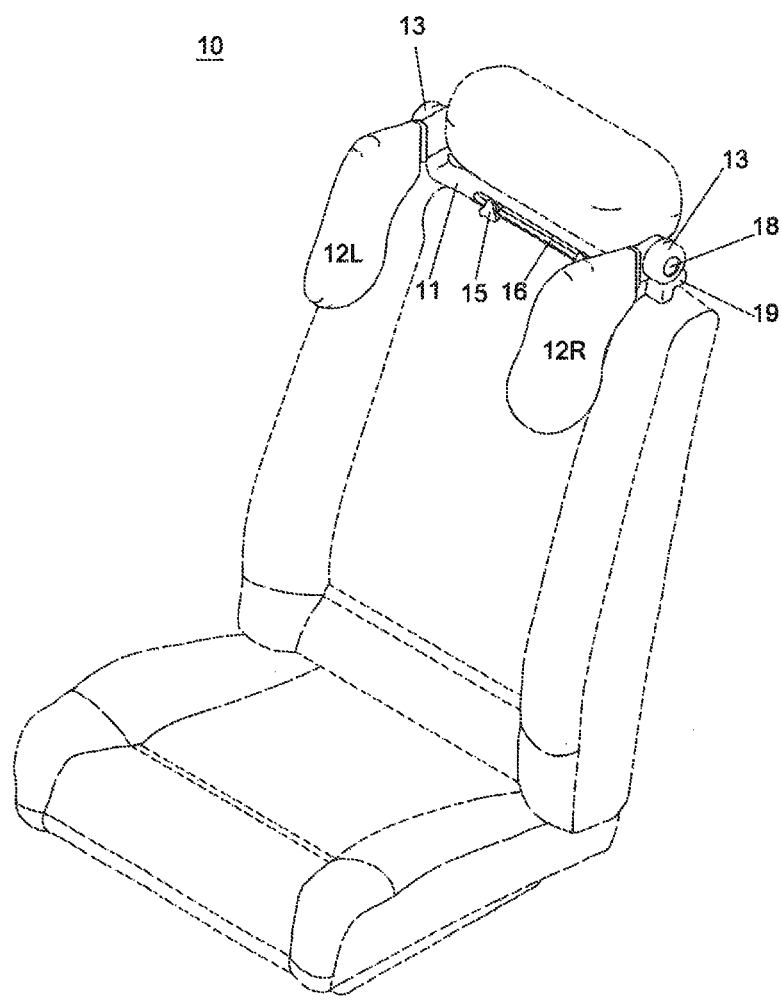
FIG. 1 illustrates a perspective view of the seat headrest.

Reference is made to FIG. 1 which illustrates one embodiment of the seat headrest 10 fully assembled and installed on a car seat. The seat headrest 10 is configured to provide additional head and neck support for a user when used in conjunction with a car headrest having a plurality of car headrest poles. The seat headrest 10 has a base 11 with one base arm 19 extending approximately perpendicular to the base 11 at each lateral end which serves as the mounting point for a first side cushion 12L and a second side cushion 12R. The first side cushion 12L and the second side cushion 12R are mounted to the base 11 at the hinge 13. Each hinge 13 has a push button 18 which functions to activate the hinge assembly (no shown). The base 11 is mounted to the existing car headrest using adjustable knobs 15 at central opening 16. The first side cushion 12L and the second side cushion 12R are bent downward from the base arm 19 to point generally downward towards a user's shoulders. This configuration of the first and second side cushion (12L and 12R) allows for slight restrain across the user's shoulders. The position of the first and second side cushions (12L and 12R) allows the user to rest their head on a rigidly positioned surface that is not normally provided by the car headrest. The user can then sleep without resulting head and neck pains caused by having their head failing into a poor position for an extended period of time.

Figure 2:
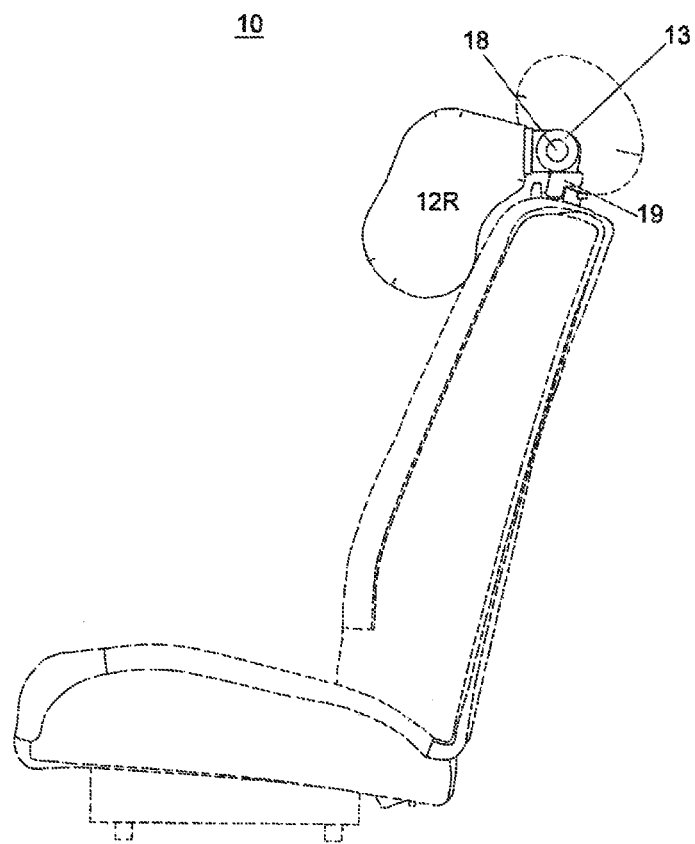
FIG. 2 illustrates a side view of the seat headrest.

Reference is made to FIG. 2 which illustrates the side view of the seat headrest 10 shown in FIG. 1. The seat headrest 10 is configured of a side cushion 12R mounted to the base 11 (not shown) at the base arm 19. The side cushion 12R also includes a hinge 13 with a push button 18.

Figure 3:
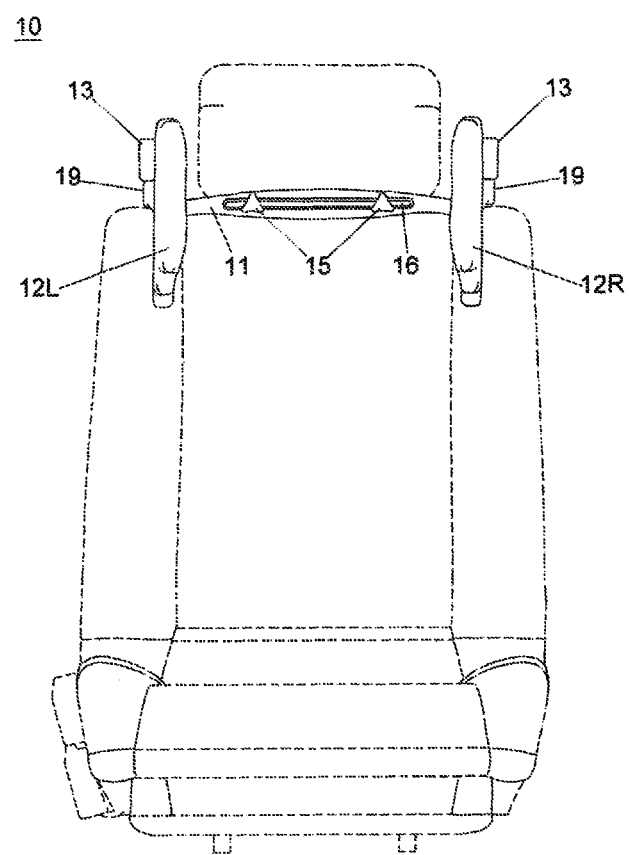
FIG. 3 illustrates a front view of the seat headrest.

Reference is made to FIG. 3 which illustrates the front view of the seat headrest 10 shown in FIG. 1. The seat headrest 10 used of a base 11 with one base arm 19 at each lateral end of the base 11 and a first side cushion 21 and a second side cushion 12R attached to the base 11 at base arm 19. The first side cushion 12L and the second side cushion 12R each have an independently acting hinge 13. The seat headrest 10 is mounted to the existing car seat in part by adjustable knobs 15 at central opening 16.

Figure 4:
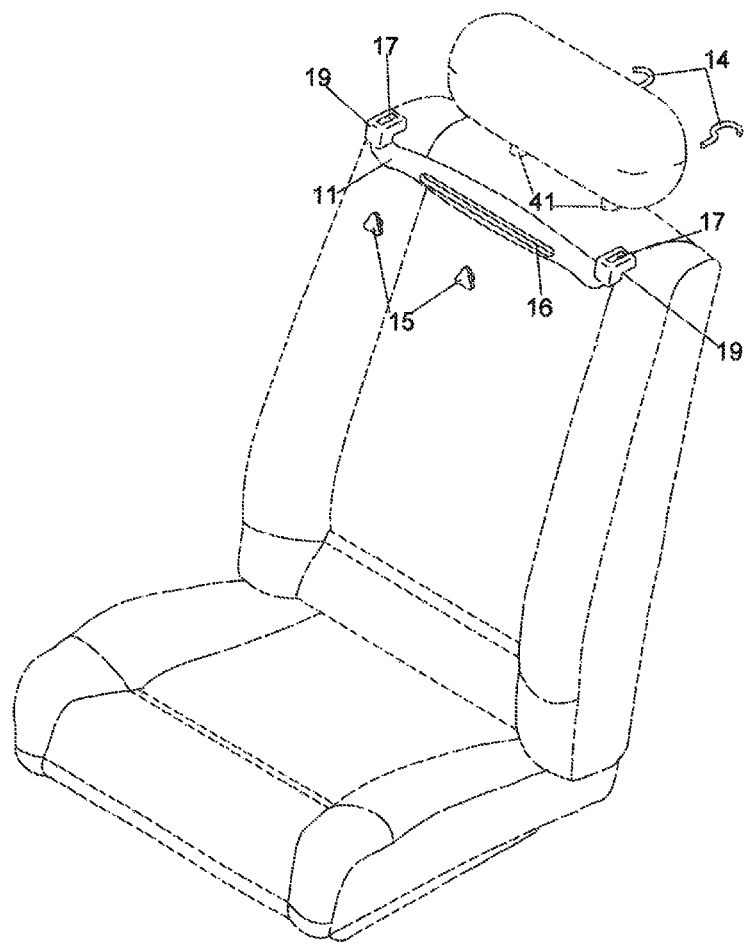
FIG. 4 illustrates an exploded perspective view of the base mount of the seat headrest.

Reference is made to FIG. 4 which illustrates the perspective view of the assembly the base mount of the seat headrest shown in FIG. 1. The base 11 secures to the plurality of car headrest poles 41 by a plurality of headrest connection points made up of screw hooks 14 and adjustable knobs 15 configured to hold securely about the diameter of the plurality of car headrest poles 41. The plurality of screw hooks 14 can slide horizontally along opening 16 in the base 11 to accommodate for the variable distance between the plurality of car headrest poles 41 which exists between vehicle models and types, planes, trains, etc. The base arms 19 having recess 17 are positioned such that once the base 11 is mounted to a car seat, the base arms 19 sit at roughly the outer edge of the standard car headrest.

Figure 5:
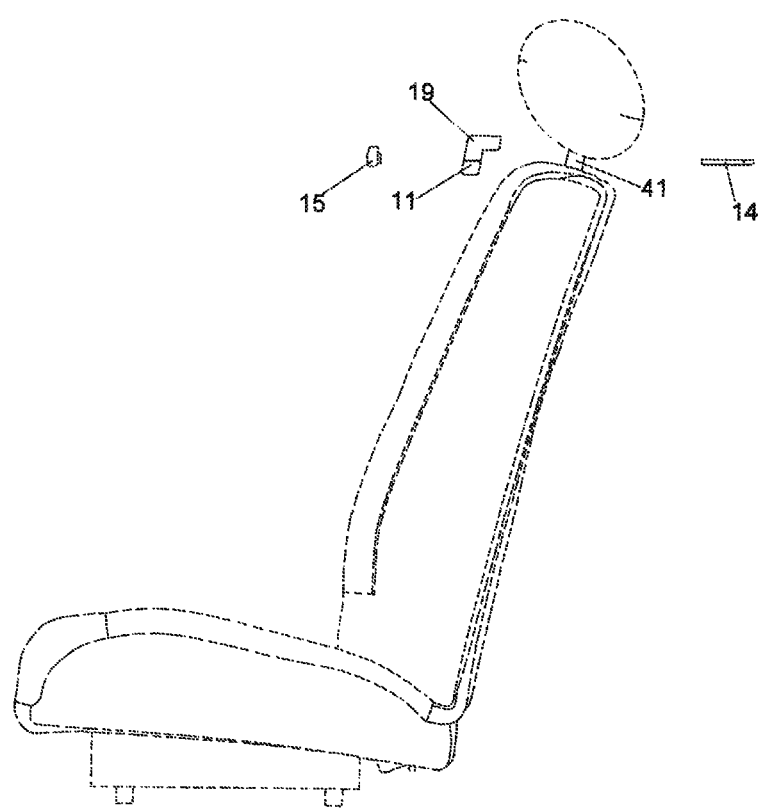
FIG. 5 illustrates an exploded side view of the base mount of the seat headrest.

Reference is made to FIG. 5 which illustrates the side view of the assembly of the base mount of the seat headrest shown in FIG. 4. The base 11 secures to the plurality of car headrest poles 41 by screw hooks 14 secured with adjustable knobs 15. Once base 11 is mounted to the car seat, base arm 19 is positioned externally to the outer edge of the standard car headrest.

Figure 6:
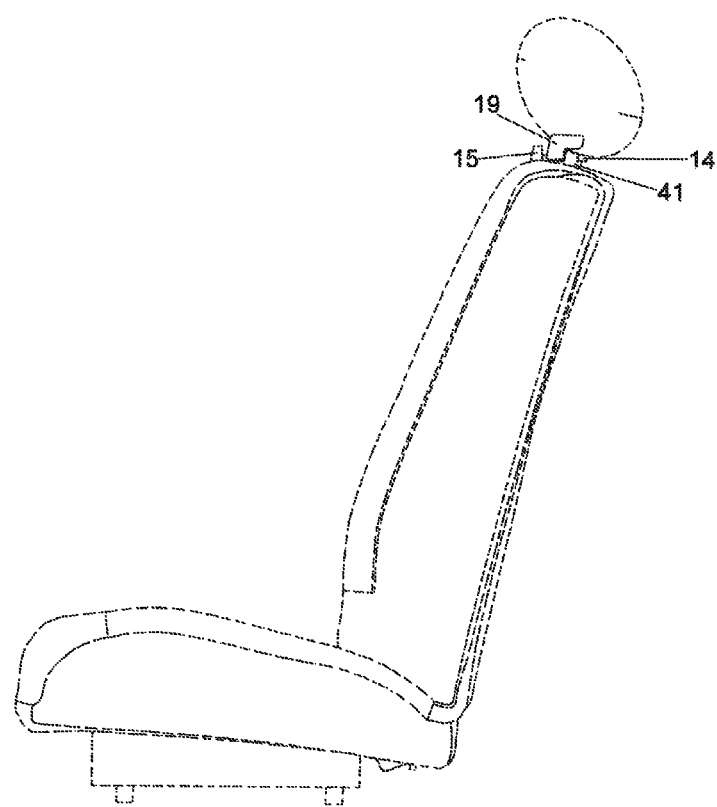
FIG. 6 illustrates a side view of the base mount of the seat headrest.
Figure 7:
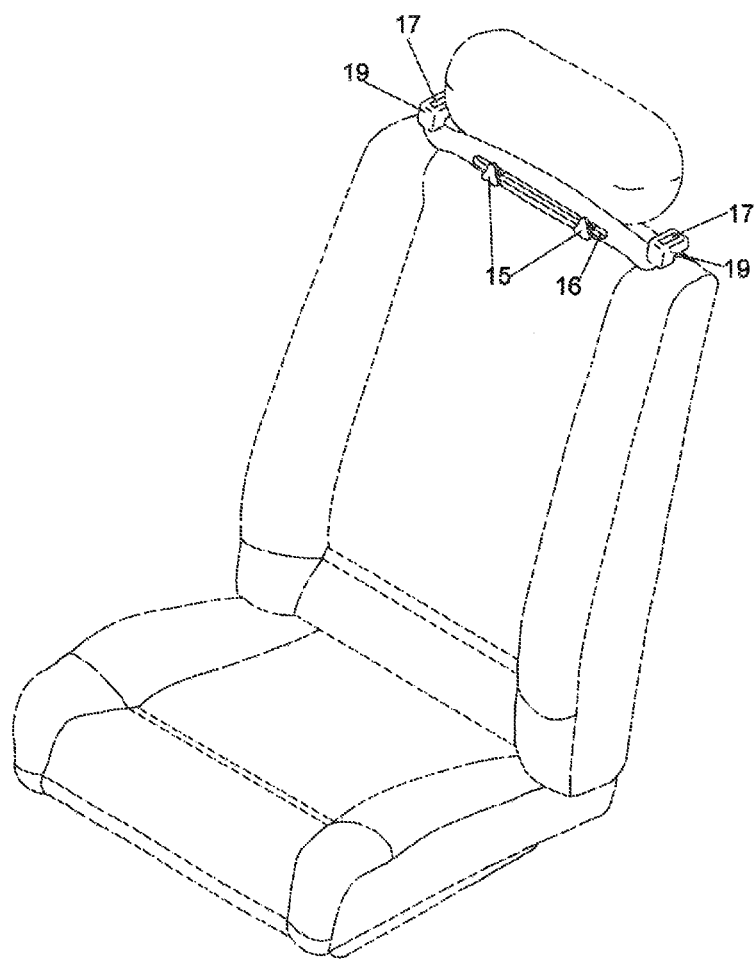
FIG. 7 illustrates a perspective view of the base mount of the seat headrest.
Figure 8:
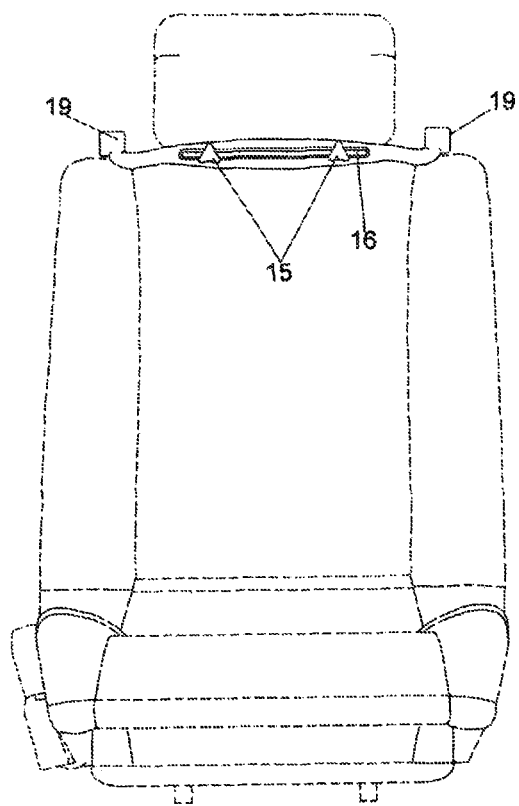
FIG. 8 illustrates a front view of the base mount of the of the seat headrest.

Reference is made to FIGS. 6, 7 and 8 which illustrate the side, perspective and front views of the mounted base of FIG. 4. FIG. 6 shows the base arm 19 positioned relative to the standard car headrest secured by screw hook 14 and adjustable knob 15. FIGS. 7 and 8 show the base 11 mounted securely between the car seat and standard car headrest in part by adjustable knobs 15 at central opening 16 such that the base arms 19 and recess 17 are positioned externally to the standard car headrest.

Figure 10:
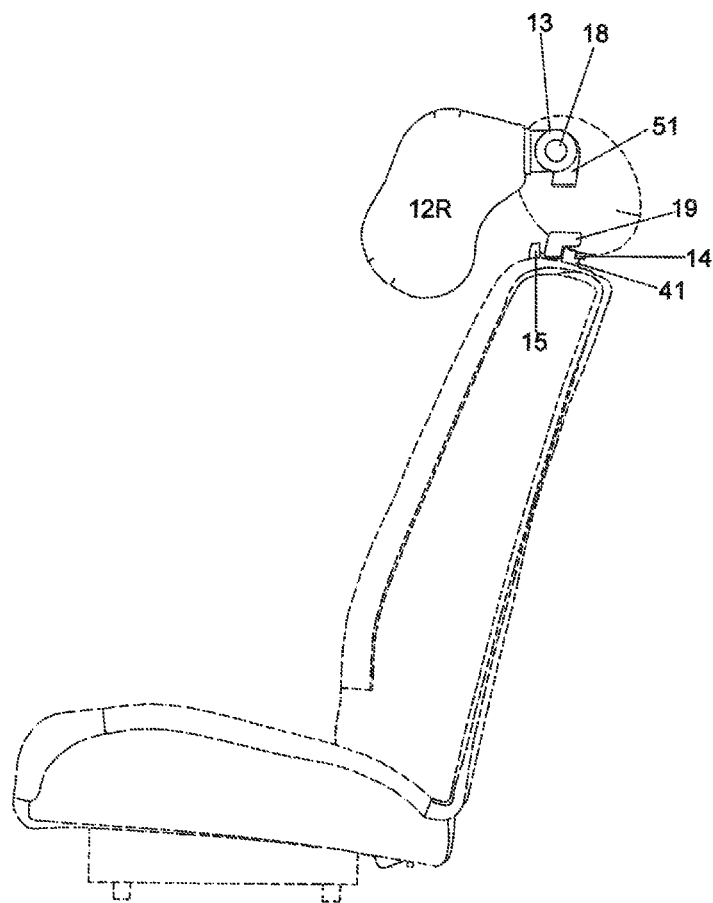
FIG. 10 illustrates a side view of the assembly of a silt, cushions to the base mount of the seat headrest.
Figure 11:
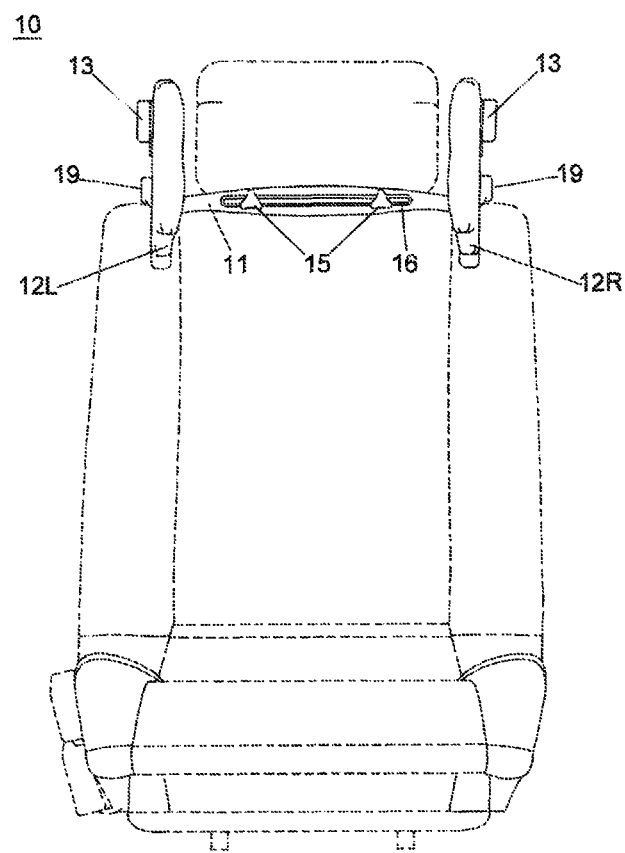
FIG. 11 illustrates a front view of the assembly of the side cushions to the base mount of the seat headrest.

Reference is made to FIGS. 10 and 11 which illustrates an exploded view of the assembly of the side cushions 12L and 12R onto the base 11. Clearly shown is a seat headrest 10 comprised of a base 11 with a central horizontal opening 16 and one base arm 19 at each lateral end which serves as the mounting point for a first side cushion 12L and a second side cushion 12R. The side cushions (12L and 12R) and their attached hinge 13 readily snap into the base 11 at recess 17. Each hinge 13 also it includes a push button 18. Full depression of push button 18 results in the release of the cantilever snaps 51, as can be seen better FIG. 14, inside recess 17 to allow for ease of assembly and disassembly of the side cushions (12L and 12R) to the base 11. The base 11 is securely mounted to the existing car headrest in part using adjustable knobs 15.

Figure 9:
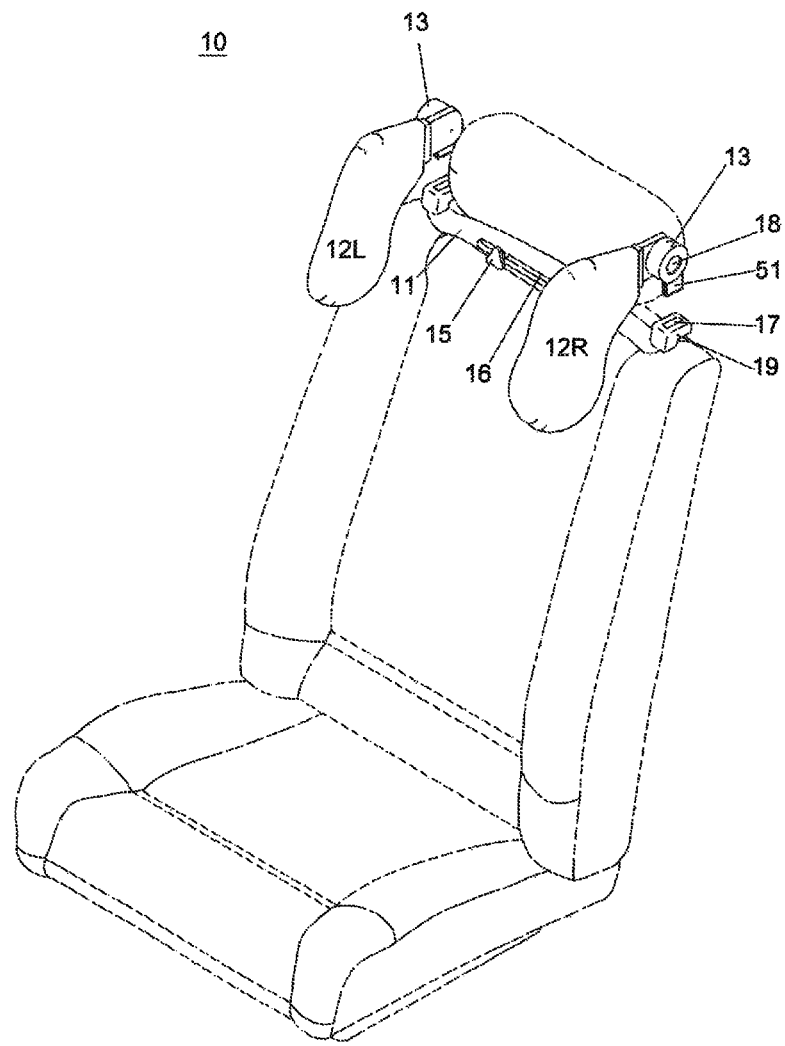
FIG. 9 illustrates a perspective view of the assembly of the side cushions to the base mount of the seat headrest.

Reference is made to FIGS. 10 and 11 which illustrate the side and front views respectively of the assembly of the side cushions 12L and 12R onto base 11 as shown in FIG. 9. In FIG. 10, the side cushion 12R is inserted into base 11 (not shown) at side arm 19 and secured with screw hook 14 and adjustable knob 15. Side cushion 12R also has a hinge 13 with a push button 18 and cantilever snaps 51 extending vertically downward from said hinge 13. In FIG. 11, the side cushions (12L and 12R) are inserted into base 11 at side arms 19. The side cushions (12L, and 12R) each have a hinge 13. The base 11 is securely mounted to the existing car headrest in part using adjustable knobs 15 at central opening 16.

Reference is made to FIG. 12 which illustrates various views of the fully assembled seat headrest. FIG. 12a shows a perspective view of the assembled seat headrest comprised of a base 11 with a side arm 19 at each lateral end of base 11 and a central opening 16, a first side cushion 12L, and a second side cushion 12R, each side cushion having a hinge 13 with a gush button 18, at least two screw hooks 14 and at least two adjustable knobs 15. FIG. 12b shows a top view of the assembled seat headrest comprised of a base 11, a first side cushion 12L and a second side cushion 12R, each side cushion having a hinge 13, at least two screw hooks 14 and at least two adjustable knobs 15. FIG. 12c shows a rear view of the assembled seat headrest comprised of a base 11 with a central opening 16, a first side cushion 12L, and a second side cushion 12R, each side cushion having a hinge 13. FIG. 12d shows the left side view of the assembled seat headrest comprised of a base 11 with a side arm 19, at least one screw hook 14 and at least one adjustable knob 15, and a first side cushion 12L, having a hinge 13 with a push button 18. FIG. 12e shows the front view of the assembled seat headrest comprised of a base 11 with a side arm 19 at each lateral end of base 11 and a central opening 16 with at least two adjustable knobs 15, a first side cushion 12L, and a second side cushion 12R, each side cushion having a hinge 13. FIG. 12f shows the right side view of the assembled seat headrest base 11 with a side arm 19, at least one screw hook 14 and at least one adjustable knob 15, and a second side cushion 12R having a hinge 13 with a push button 18.

Reference is made to FIG. 13 which illustrates various exploded views of the disassembled seat headrest shown in FIG. 12. FIG. 13a shows a perspective view of a base 11 with a side arm 19 at each lateral end of base 11 and a central opening 16, each side arm 19 having a recess 17, a first side cushion 12L and a second side cushion 12R, each side cushion having a hinge 13 with a push button 18, at least two screw hooks 14 and at least two adjustable knobs 15. FIG. 13b shows the top view of a seat headrest comprised of a base 11, a first side cushion 12L and a second side cushion 12R, each side cushion having a hinge 13, at least two screw hooks 14 and at least two adjustable knobs 15. FIG. 13c shows the rear view of a seat headrest comprised of a base 11 with side arms 19 and a central opening 16, a first side cushion 12L and a second side cushion 12R, each side cushion having a hinge 13, each hinge 13 having a pair of cantilever snaps 51 extending downward from said hinge 13. FIG. 13d shows the left side view of a seat headrest comprised of a base 11 with a side arm 19, at least one screw hook 14 and at least one adjustable knob 15, and a first side cushion 12L, having a hinge 13 with a push button 18 and a pair of cantilever snaps 51 extending downward from said hinge 13. FIG. 13e shows the front view of the seat headrest comprised of a base 11 with a side arm 19 at each lateral end of base 11 and a central opening 16 with at least two adjustable knobs 15, a first side cushion 12L, and a second side cushion 12R, each side cushion having a hinge 13. FIG. 13f shows the right side view of a seat headrest comprised of a base 11 with a side arm 19, at least one screw hook 14 and at least one adjustable knob 15, and a second side cushion 12R having a hinge 13 with a push button 18 and a pair of cantilever snaps 51 extending downward from said hinge 13.

Figure 14:
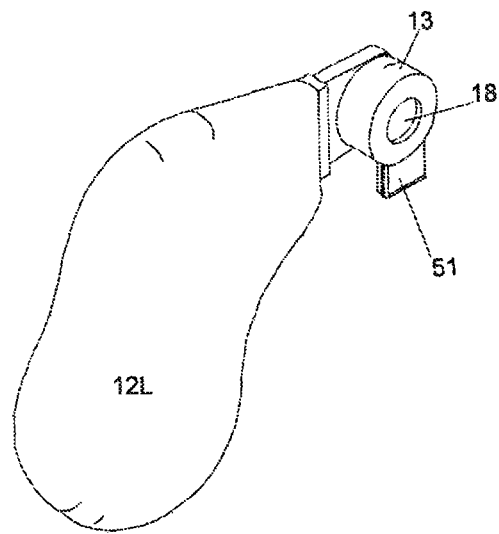
FIG. 14 illustrates a perspective view of the side cushion of the seat headrest.

Reference is made to FIG. 14 which illustrates a close up view of a side cushion of the seat headrest. The first side cushion 12L, has a hinge 13 comprised of a push button 18 in the center of said hinge 13 and pair of cantilever snaps 51 extending vertically downward from said hinge 13.

Figure 15:
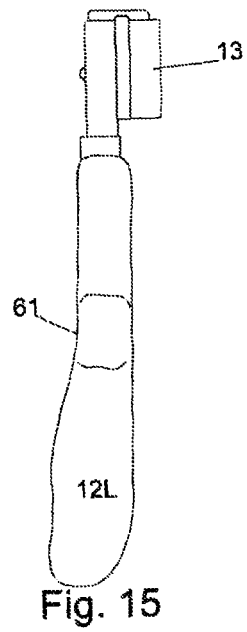
FIG. 15 illustrates a top view of the side cushion of the seat headrest.

Reference is made to FIG. 15 which illustrates the contour nature of the side cushions 12. A top of a side cushion 12L and attached hinge 13 are shown. The bottom most end of the side cushion 12L has an angle between 15° and 25° beginning preferably at the midpoint 61 of said side cushion 12L.

Figure 16:
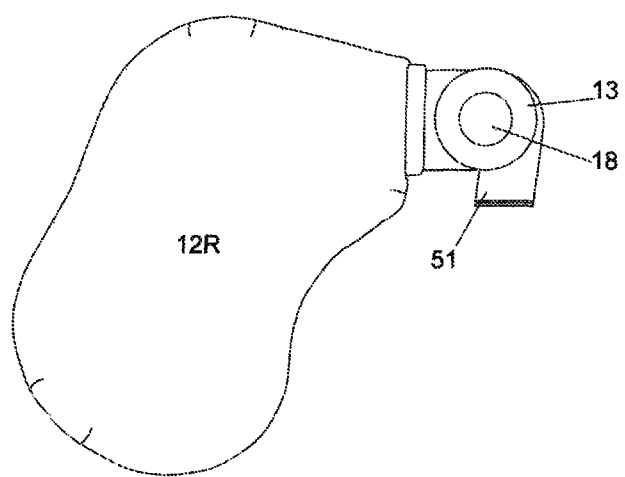
FIG. 16 illustrates a side view of the side cushion of the seat headrest.

Reference is made to FIG. 16 which illustrates the side view of the side cushion of the seat headrest shown in FIG. 14. The side cushion 12R has an attached hinge 13 with a push button 18 and a pair of cantilever snaps 51 extending vertically downward from said hinge 13. In a preferred embodiment, the side cushion 12R may be covered by a padded material such as foam to provide a soft, cushioned surface. The side cushion is then wrapped by a soft outer material such as fabric or nylon to cover the padded material and provide a more desirable aesthetic. The soft outer material can have a design print or be monochrome without departing from the spirit of the present invention.

Figure 17:
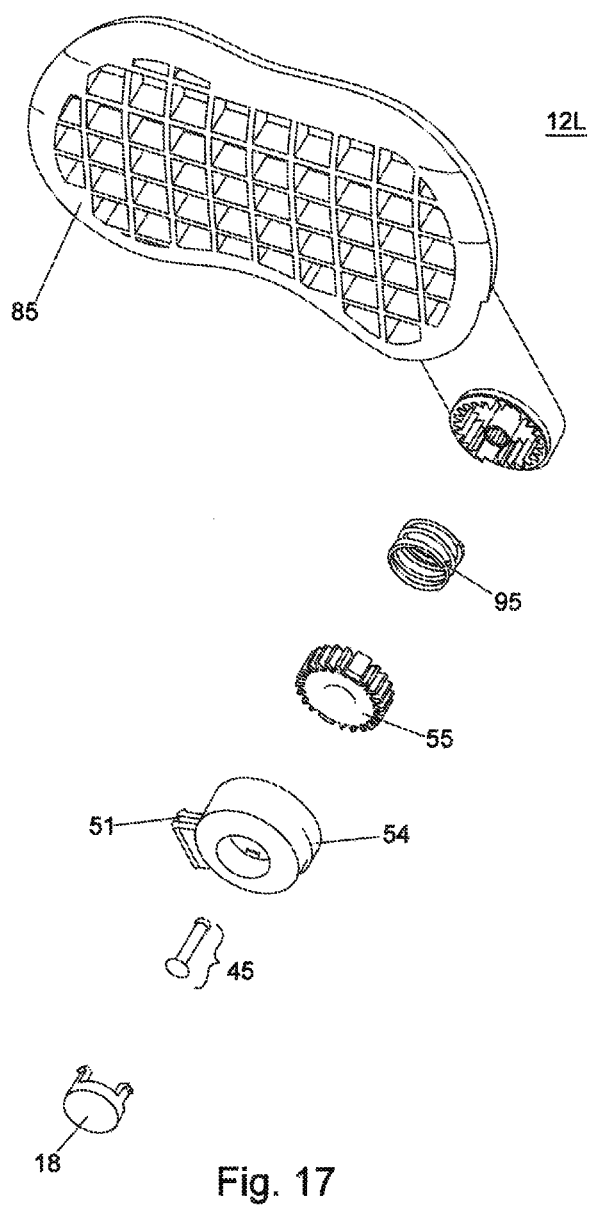
FIG. 17 illustrates an exploded view of the hinge within the side cushion of the seat headrest.

Reference is made to FIG. 17 which illustrates the hinge 13 integrated into each of the first and second side cushions. The first side cushion 12L and integrated hinge 13 is further comprised of a push button 18 that once pressed engages and disengages a gear 55 and a compression spring 95 to allow said side cushion to move freely between locking positions. The gear 55 and compression spring 95 are held together by a pin 45 within the hinge cap 54. The hinge 13 provides vertical adjustment of the side cushions (12L and 12R) to accommodate the height and comfort needs of the user or in the alternative to allow the side cushions (12L and 12R) to be moved out of the way when not in use such as when a user is entering or exiting the vehicle. The side cushion 12L may have a waffled structure 85 to reduce the manufacturing costs of the cushions as well as the overall weight of the cushions. In yet another alternative embodiment the push button 18 within the integrated hinge 13 may be recessed in relation to the hinge cap.

Figure 18:
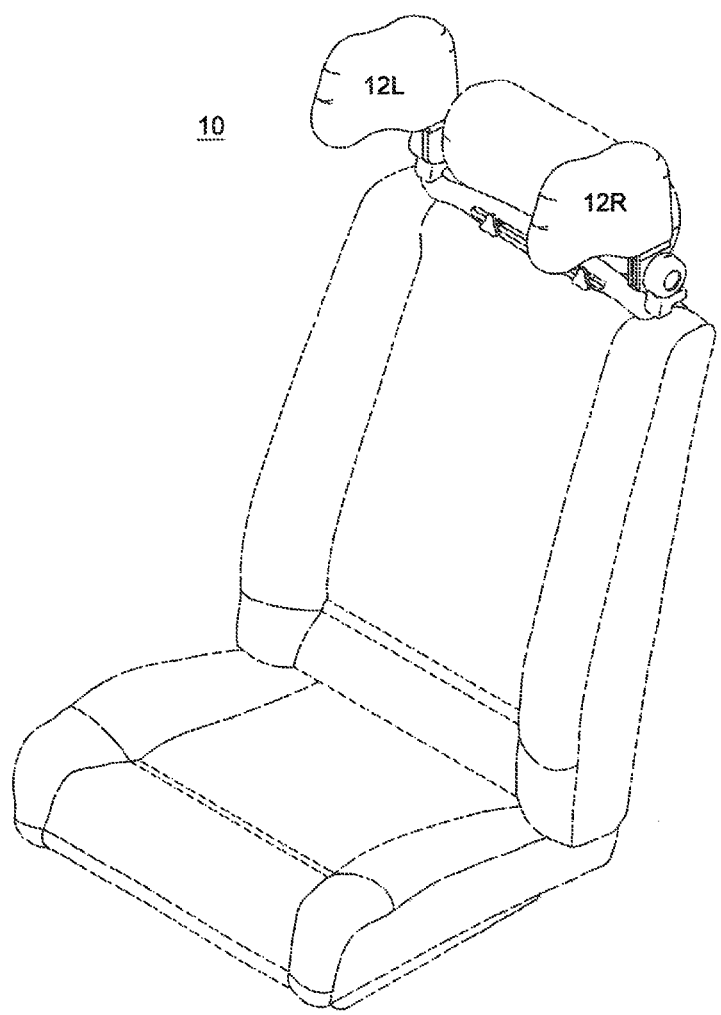
FIG. 18 illustrates a perspective view of a second alternative positioning of the seat headrest.
Figure 19:
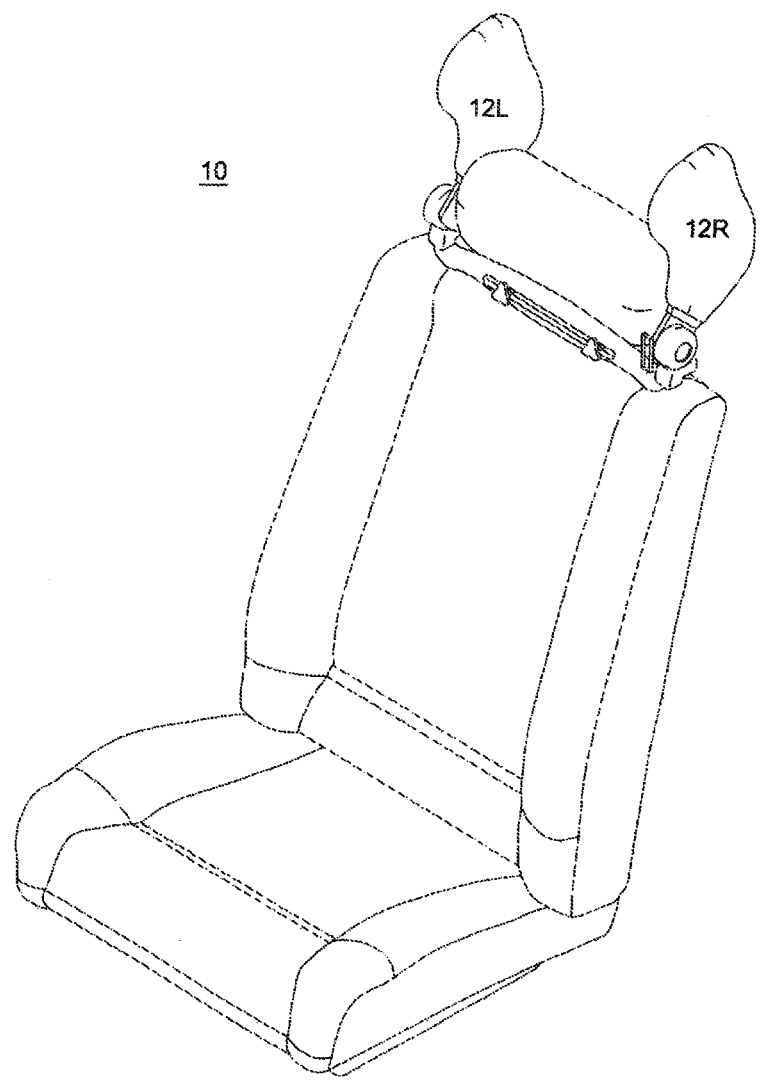
FIG. 19 illustrates a perspective view of a third alternative positioning of the seat headrest.

Reference is made to FIGS. 18 and 19 which illustrate alternative positioning of the side cushions of the fully assembled seat headrest 10. FIG. 18 shows the vertical repositioning of the side cushions (12L and 12R) of the seat headrest. FIG. 19 shows the side cushions (12L and 12R) in the stowed position when not in use.

In an alternative embodiment the seat headrest utilizes a frictional hinge at the junction of the base arm. The frictional hinge is comprised of plurality of washers, preferably constructed of nylon, and a bolt and nut to apply pressure to the frictional hinge to prevent movement of the side cushion once the side cushion is in the desired vertical position.

In another alternative embodiment, the hinge may be replaced with a pivot button having an integrated gear and compression spring to adjust the position of the side cushion.

An alternative embodiment reconfigures the positioning and structure of the base, the first side cushion and the second side cushion. The base would have a plurality of car headrest connector holes passing through the base. The plurality of car headrest connector holes allows for the car headrest poles to pass through the base securing the base to the car headrest. The base is then configured to extend in an outward direction forward of the car headrest. The first side cushion and the second side cushion would then the pivotally coupled to the base. The pivotal coupling allows the first side cushion and the second side cushion to pivot about an axis extending from the base. The angular position of the first side cushion and the second side cushion would be fixed by a frictional hinge.

While the preferred embodiment of the present invention is directed toward supplementing standard car headrests, it is not outside the scope of this invention to supplement other headrests on commercial buses, airplanes, trains or any other vehicle having headrests. The configuration of the plurality of headrest connection points would have to be modified to accommodate the number of headrest poles in the corresponding headrest. This may require that only one headrest connection point be used instead of a plurality with the addition of a stabilizing feature such as an elastic strap to better facilitate proper coupling. Furthermore, while described as a seat headrest, the user is not limited to any particular type of seat or user.

It is contemplated that the present invention be used in conjunction with booster seats. Toddlers that are too big for car seats but are too small to use the standard seat belt are required to ride in booster seats. Often, the child in the booster seat is also too small to benefit from the position of the traditional seat headrest because of their small stature and the fact that standard car headrests are designed to fit the average adult. The present invention provides for supplemental support for the head and neck of a child using a booster seat without requiring permanent alteration of the existing seat headrest. The user can also be an adult seeking additional at support while traveling in a vehicle without departing from the scope of the invention.

Many alterations and modifications may be made by those having ordinary skill in the art without departing from the spirit and scope of the invention. Therefore, it must be understood that the illustrated embodiments have been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

While the particular seat headrest as herein shown and disclosed in detail is fully capable of obtaining the objects and providing the advantages herein before stated, it is to be understood that it is merely illustrative of the presently preferred embodiments of the invention and that limitations are intended to the details of construction or design herein shown other than as described in the appended claims.

We claim:

1. A supplemental seat headrest for providing head and neck support to a user in a passenger vehicle when used in conjunction with an existing seat headrest, the supplemental seat headrest comprising:

a base portion comprising an elongated opening extending along a length of the base portion, a plurality of screw hooks having respective shafts that extend through the elongated opening and that are adjustably engaged with adjustable knobs at respective first ends of the screw hooks and the screw hooks having hook elements at respective second ends of the screw hooks opposite the first ends, wherein the hook elements are for engaging respective posts of the existing seat headrest;

at least one side cushion supported on a lateral end of the base portion; and a plurality of seat connection points corresponding to respective positions of the screw hooks in the elongated opening of the base portion.

2. The supplemental seat headrest of claim 1, wherein the base portion fits securely in a horizontal orientation within a space between a seat and the existing seat headrest.

3. The supplemental seat headrest of claim 2, wherein the base portion further includes a base arm located at each lateral end of said base, said base arm extending approximately perpendicular to said base.

4. The supplemental seat headrest of claim 3, wherein the base arm further includes a recess within the base arm for receiving a side cushion.

5. The supplemental seat headrest of claim 1, wherein the at least one side cushion is further comprised of an integrated hinge and a pair of cantilever snaps.

6. The supplemental seat headrest of claim 5, wherein the at least one side cushion is removably attached to the base portion utilizing said cantilever snaps.

7. The supplemental seat headrest of claim 1, wherein the at least one side cushion is configured in a downward orientation from the base arm to point generally downward towards a user's shoulders.

8. The supplemental seat headrest of claim 7, wherein the at least one side cushion further curves inward towards a user's shoulders at an angle between 15° and 25° beginning preferably at the midpoint of the side cushion.

9. The supplemental seat headrest of claim 5, wherein the integrated hinge is further comprised of:
a compression spring;
a gear;
a hinge cap with the integrated cantilever snaps;
a pin; and
a push button.

10. The supplemental seat headrest of claim 9, wherein the integrated hinge provides for repositioning of the at least one side cushion.

11. The supplemental seat headrest of claim 9, wherein reposition of the at least one side cushion is achieved by depression of the push button which further activates the compression spring, thereby allowing for the rotation of the hinge cap and gear to facilitate movement of said side cushion to a desired position.

12. The supplemental seat headrest of claim 5, wherein the integrated hinge is a frictional hinge.

13. The supplemental seat headrest of claim 1, wherein the pair of screw hooks engage the headrest poles of the existing headrest and extend through the elongated opening in the base portion to be secured by the adjustable knobs, thereby securing the base portion to the existing seat headrest.

14. The supplemental seat headrest of claim 9, wherein the push button is recessed relative to the hinge cap.

* * * * *

UNITED STATES PATENT AND TRADEMARK OFFICE
CERTIFICATE OF CORRECTION

PATENT NO. : 9,616,789 B2  Page 1 of 2
APPLICATION NO. : 14/407057
DATED : April 11, 2017
INVENTOR(S) : Arriola et al.

It is certified that error appears in the above-identified patent and that said Letters Patent is hereby corrected as shown below:

On the Title Page

Abstract, Line 6: the word "users" should read "user's";

In the Specification

Column 1, Line 22: the word "headrest" should read "headrests";

Column 1, Line 24: the word "a" should be replaced with the word "the";

Column 1, Line 26: delete the ",";

Column 1, Line 29: the word "sufficiently" should read "sufficient";

Column 1, Line 33: insert a --,-- after the word "user";

Column 1, Line 37: the word "to" should read "top";

Column 1, Line 42: insert the word --a-- in front of the word "chair";

Column 1, Line 56: the word "retraining" should read "restraining";

Column 2, Line 1: the word "preventing" should read "prevent";

Column 3, Line 64: insert the word --the-- before the word "central";

Column 4, Line 2: the word "restrain" should read "restraint";

Column 4, Line 22: insert the word --the-- before the word "central";

Signed and Sealed this
Thirteenth Day of June, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,616,789 B2

Column 4, Line 23: insert the word --and-- after the word "assembly";

Column 4, Line 30: insert the word --the-- before the word "opening";

Column 4, Line 50: insert the word --the-- before the word "central";

Column 4, Line 53: the word "illustrates" should read "illustrate";

Column 4, Line 61: delete the word "it";

Column 4, Line 63: insert the word --in-- before the word "FIG";

Column 5, Line 12: the word "contour" should read "contoured";

Column 7, Line 4: insert the word --be-- after the word "then";

Column 7, Line 34: delete the word "in";

Column 7, Line 46: delete the word "in".